United States Patent
Luo et al.

(10) Patent No.: US 8,188,201 B2
(45) Date of Patent: *May 29, 2012

(54) BULK POLYMERIZATION PROCESS FOR PRODUCING POLYDIENES

(75) Inventors: Steven Luo, Copley, OH (US); Kevin McCauley, Coventry Township, OH (US); Jason T. Poulton, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 216 days.

This patent is subject to a terminal disclaimer.

(21) Appl. No.: 12/345,901

(22) Filed: Dec. 30, 2008

(65) Prior Publication Data

US 2010/0004413 A1    Jan. 7, 2010

Related U.S. Application Data

(60) Provisional application No. 61/017,855, filed on Dec. 31, 2007.

(51) Int. Cl.
*C08F 4/44* (2006.01)
*C08F 4/52* (2006.01)
*C08F 36/06* (2006.01)
*C08F 36/00* (2006.01)

(52) U.S. Cl. ........ 526/164; 526/161; 526/172; 526/137; 526/144; 526/335

(58) Field of Classification Search .................. 526/164, 526/154, 335, 161, 172
See application file for complete search history.

(56) References Cited

U.S. PATENT DOCUMENTS

| | | |
|---|---|---|
| 1,223,396 A | 4/1917 | Karlsson |
| 2,227,957 A | 1/1941 | Brasse |
| 3,297,667 A | 1/1967 | von Dohlen et al. |
| 3,541,063 A | 11/1970 | Throckmorton et al. |
| 3,742,057 A | 6/1973 | Bunting et al. |
| 3,794,604 A | 2/1974 | Throckmorton et al. |
| 3,886,127 A | 5/1975 | Furukawa et al. |
| 3,998,998 A | 12/1976 | Uraneck et al. |
| 4,185,042 A | 1/1980 | Verkouw |
| 4,461,883 A | 7/1984 | Takeuchi et al. |
| 4,751,275 A | 6/1988 | Witte et al. |
| 4,791,174 A | 12/1988 | Bronstert et al. |
| 4,906,706 A * | 3/1990 | Hattori et al. ................. 525/343 |
| 4,990,573 A | 2/1991 | Andreussi et al. |
| 5,064,910 A | 11/1991 | Hattori et al. |
| 5,066,729 A | 11/1991 | Stayer et al. |
| 5,109,907 A | 5/1992 | Stayer et al. |
| 5,227,431 A | 7/1993 | Lawson et al. |
| 5,310,798 A | 5/1994 | Lawson et al. |
| 5,508,333 A | 4/1996 | Shimizu |
| 5,567,784 A | 10/1996 | Wieder et al. |
| 5,844,050 A | 12/1998 | Fukahori et al. |
| 5,866,171 A | 2/1999 | Kata |
| 5,866,650 A | 2/1999 | Lawson et al. |
| 5,876,527 A | 3/1999 | Tsuruta et al. |
| 5,916,961 A | 6/1999 | Hergenrother et al. |
| 5,931,211 A | 8/1999 | Tamura |
| 5,971,046 A | 10/1999 | Koch et al. |
| 6,117,927 A | 9/2000 | Toba et al. |
| 6,172,160 B1 | 1/2001 | Nakamura et al. |
| 6,194,505 B1 | 2/2001 | Sone et al. |
| 6,197,713 B1 | 3/2001 | Lynch |
| 6,197,888 B1 | 3/2001 | Luo |
| 6,255,416 B1 | 7/2001 | Sone et al. |
| 6,291,591 B1 | 9/2001 | Luo |
| 6,303,692 B1 | 10/2001 | Luo |
| 6,699,813 B2 * | 3/2004 | Luo et al. ....................... 502/119 |
| 6,759,497 B2 | 7/2004 | Grun et al. |
| 6,838,526 B1 * | 1/2005 | Sone et al. ................. 525/332.8 |
| 6,838,534 B2 | 1/2005 | Laubry |
| 6,897,270 B2 | 5/2005 | Ozawa et al. |
| 6,943,250 B2 | 9/2005 | Brockmann |
| 6,977,281 B1 | 12/2005 | Ozawa et al. |
| 6,992,147 B1 * | 1/2006 | Ozawa et al. ................. 525/342 |
| 7,008,899 B2 * | 3/2006 | Luo et al. ....................... 502/131 |
| 7,056,998 B2 | 6/2006 | Laubry et al. |
| 7,094,849 B2 * | 8/2006 | Luo et al. ....................... 526/164 |
| 7,153,919 B2 | 12/2006 | Hogan et al. |
| 7,294,680 B2 | 11/2007 | Sone et al. |
| 7,335,712 B2 | 2/2008 | Yan et al. |
| 7,351,776 B2 | 4/2008 | Tartamella et al. |
| 7,741,418 B2 * | 6/2010 | Luo et al. ....................... 526/142 |
| 7,807,763 B2 * | 10/2010 | Smale et al. ................... 526/164 |

(Continued)

FOREIGN PATENT DOCUMENTS

DE    138 070    10/1979

(Continued)

OTHER PUBLICATIONS

European Search Report, Application No. EP 08 25 4179 dated Jul. 9, 2009.

Z. Shen, J. Ouyang, F. Wang, Z. Hu, F. Yu, and B. Qian, Journal of Polymer Science: Polymer Chemistry Edition, 1980, vol. 18, pp. 3345-3357.

H.L. Hsieh, H.C. Yeh, Rubber Chemistry and Technology, 1985, vol. 58, pp. 117-145.

D.J. Wilson, Journal of Polymer Science, Part A, Polymer Chemistry, 1995, vol. 33, pp. 2505-2513.

R.P. Quirk, A.M. Kells, Polymer International, 2000, vol. 49, pp. 751-756.

(Continued)

*Primary Examiner* — Rip A. Lee

(74) *Attorney, Agent, or Firm* — Meredith E. Hooker; Arthur Reginelli

(57) ABSTRACT

A process for preparing a polydiene, the process comprising the step of polymerizing conjugated diene monomer with a lanthanide-based catalyst system including the combination or reaction product of: (a) a lanthanide compound selected from the group consisting of lanthanide organophosphates, lanthanide organophosphonates, and lanthanide organophosphinates, (b) an alkylating agent, and (c) a chlorine-containing compound, where said step of polymerizing takes place within a polymerization mixture that includes less than 20% by weight of solvent based on the total weight of the polymerization mixture.

29 Claims, No Drawings

U.S. PATENT DOCUMENTS

| | | |
|---|---|---|
| 8,017,695 B2 | 9/2011 | Luo et al. |
| 2005/0131174 A1 | 6/2005 | Luo et al. |
| 2005/0197474 A1* | 9/2005 | Tartamella et al. ........... 526/335 |
| 2006/0004131 A1 | 1/2006 | Ozawa et al. |
| 2006/0025539 A1 | 2/2006 | Ozawa et al. |
| 2006/0030677 A1 | 2/2006 | Ozawa et al. |
| 2006/0264589 A1 | 11/2006 | Yan et al. |
| 2006/0264590 A1 | 11/2006 | Hogan et al. |
| 2007/0149717 A1 | 6/2007 | Luo et al. |
| 2007/0276122 A1 | 11/2007 | Luo |
| 2008/0051519 A1 | 2/2008 | Luo et al. |
| 2008/0051552 A1 | 2/2008 | Luo et al. |
| 2008/0146745 A1 | 6/2008 | Luo et al. |
| 2008/0154020 A1 | 6/2008 | Yan et al. |
| 2009/0043046 A1 | 2/2009 | Luo et al. |
| 2009/0043055 A1 | 2/2009 | Luo et al. |
| 2009/0099325 A1 | 4/2009 | Luo et al. |
| 2009/0171035 A1 | 7/2009 | Luo et al. |
| 2010/0099826 A1 | 4/2010 | Ozawa et al. |
| 2010/0168378 A1 | 7/2010 | Luo |
| 2010/0280217 A1 | 11/2010 | Luo et al. |
| 2011/0077325 A1 | 3/2011 | Luo |
| 2011/0144282 A1 | 6/2011 | Luo |
| 2011/0152449 A1 | 6/2011 | Luo et al. |

FOREIGN PATENT DOCUMENTS

| | | |
|---|---|---|
| EP | 0924214 | 6/1999 |
| EP | 0924214 A2 | 6/1999 |
| EP | 0863165 | 6/2003 |
| GB | 835752 | 5/1960 |
| GB | 2161169 A | 1/1986 |
| JP | 60-023406 | 2/1985 |
| JP | 05-051406 | 3/1993 |
| JP | 05-059103 | 3/1993 |
| JP | 6015598 B2 | 3/1994 |
| JP | 10-306113 | 11/1998 |
| JP | 11-035633 | 2/1999 |
| RU | 2114128 C1 | 6/1998 |
| WO | 01/34659 | 5/2001 |
| WO | WO 01/96425 A2 | 12/2001 |
| WO | 02/38615 | 5/2002 |

OTHER PUBLICATIONS

I. Hattori et al., "Modification of Neodymium High cis-1,4 Polybutadiene with Tin Compounds", Journal of Elastomers and Plastics, 1991, vol. 23, pp. 135-151.

I. Hattori et al., "Chemical Modification of Neodymium High cis-1,4-Polybutadiene with Styreneoxide", Polymers for Advanced Technologies, vol. 4, pp. 450-456.

Henry L. Hsieh, Gene H. C. Yeh, Ind. Eng. Chem. Prod. Dev. 1986, 25, pp. 456-463.

Office Action dated Nov. 26, 2010 for technology related U.S. Appl. No. 11/955,437; 18 pages.

* cited by examiner

BULK POLYMERIZATION PROCESS FOR PRODUCING POLYDIENES

This application claims the benefit of U.S. Provisional Patent Application Ser. No. 61/017,855, filed Dec. 31, 2007, which is incorporated herein by reference.

FIELD OF THE INVENTION

One or more embodiments of the present invention are directed toward a bulk polymerization process for producing polydienes having a combination of a high cis-1,4-linkage content and a narrow molecular weight distribution. Other embodiments are directed toward the catalyst compositions employed in these processes.

BACKGROUND OF THE INVENTION

Polydienes may be produced by solution polymerization, wherein conjugated diene monomer is polymerized in an inert solvent or diluent. The solvent serves to solubilize the reactants and products, to act as a carrier for the reactants and product, to aid in the transfer of the heat of polymerization, and to help in moderating the polymerization rate. The solvent also allows easier stirring and transferring of the polymerization mixture (also called cement), since the viscosity of the cement is decreased by the presence of the solvent. Nevertheless, the presence of solvent presents a number of difficulties. The solvent must be separated from the polymer and then recycled for reuse or otherwise disposed of as waste. The cost of recovering and recycling the solvent adds greatly to the cost of the polymer being produced, and there is always the risk that the recycled solvent after purification may still retain some impurities that will poison the polymerization catalyst. In addition, some solvents such as aromatic hydrocarbons can raise environmental concerns. Further, the purity of the polymer product may be affected if there are difficulties in removing the solvent.

Polydienes may also be produced by bulk polymerization (also called mass polymerization), wherein conjugated diene monomer is polymerized in the absence or substantial absence of any solvent, and, in effect, the monomer itself acts as a diluent. Since bulk polymerization is essentially solventless, there is less contamination risk, and the product separation is simplified. Bulk polymerization offers a number of economic advantages including lower capital cost for new plant capacity, lower energy cost to operate, and fewer people to operate. The solventless feature also provides environmental advantages, with emissions and waste water pollution being reduced.

Lanthanide-based catalyst systems that comprise a lanthanide compound, an alkylating agent, and a halogen source are known to be useful for producing conjugated diene polymers having high cis-1,4-linkage contents. Nevertheless, when applied to bulk polymerization of conjugated dienes, lanthanide-based catalyst systems generally provide cis-1,4-polydienes having a molecular weight distribution of more than 2.5.

It is known that cis-1,4-polydienes having a narrower molecular weight distribution give lower hysteresis. It is also known that cis-1,4-polydienes having higher cis-1,4-linkage content exhibit the increased ability to undergo strain-induced crystallization and thus give superior physical properties such as higher tensile strength and higher abrasion resistance. Therefore, it is desirable to develop a method for producing cis-1,4-polydienes having a higher cis-1,4-linkage content and a narrower molecular weight distribution.

Preformed lanthanide-based catalysts have been described. These catalysts have been prepared by mixing (a) a conjugated diene monomer, (b) an organic phosphoric acid salt of a rare earth metal, (c) a trialkylaluminum compound or a dialkylaluminum hydride, and (d) an alkylaluminum halide, followed by aging the mixture for a certain period of time prior to bringing the preformed catalyst into contact with the conjugated diene monomer that is to be polymerized. However, the preformed catalysts are less convenient to be employed in a commercial production process because the preparation, aging, and storing of the preformed catalysts requires a separate reaction vessel in addition to the polymerization vessel. In addition, the activity, selectivity, and other performance characteristics of the preformed catalysts can undergo alteration during aging and storage, which causes difficulty in controlling the polymerization process and obtaining desired polymer properties. For these reasons, it is often advantageous to employ a catalyst that is formed in situ.

SUMMARY OF THE INVENTION

One or more embodiments of the present invention provide a process for preparing a polydiene, the process comprising the step of polymerizing conjugated diene monomer with a lanthanide-based catalyst system including the combination or reaction product of: (a) a lanthanide compound selected from the group consisting of lanthanide organophosphates, lanthanide organophosphonates, and lanthanide organophosphinates, (b) an alkylating agent, and (c) a chlorine-containing compound, where said step of polymerizing takes place within a polymerization mixture that includes less than 20% by weight of solvent based on the total weight of the polymerization mixture.

Other embodiments provide a process for preparing a polydiene, the process comprising the step of introducing (a) conjugated diene monomer, (b) a lanthanide compound selected from the group consisting of lanthanide organophosphates, lanthanide organophosphonates, and lanthanide organophosphinates, (c) an alkylating agent, and (d) a chlorine-containing compound, where said step of introducing forms a polymerization mixture that includes less than 20% by weight of solvent based on the total weight of the polymerization mixture.

Other embodiments provide a catalyst system formed by a process comprising the steps of (i) introducing a lanthanide compound selected from the group consisting of lanthanide organophosphates, lanthanide organophosphonates, and lanthanide organophosphinates with a Lewis acid and a solvent or monomer to form a solution including the lanthanide compound; and (ii) introducing the solution including the lanthanide compound with an alkylating agent, and a chlorine-containing compound.

Still other embodiments provide a cis-1,4-polydiene prepared by a process comprising the step of introducing (a) conjugated diene monomer, (b) a lanthanide compound selected from the group consisting of lanthanide organophosphates, lanthanide organophosphonates, and lanthanide organophosphinates, (c) an alkylating agent, and (d) a chlorine-containing compound, where said step of introducing forms a polymerization mixture that includes less than 20% by weight of solvent based on the total weight of the polymerization mixture.

Still other embodiments provide a process for preparing a polydiene, the process comprising the steps of (i) providing monomer to be polymerized; (ii) introducing a lanthanide compound to the monomer to be polymerized, where the lanthanide compound is selected from the group consisting of lanthanide organophosphates, lanthanide organophosphonates, and lanthanide organophosphinates, where said step of introducing a lanthanide compound may optionally include introducing an alkylating agent, a Lewis acid, additional monomer to be polymerized, or a combination of two or more of the alkylating agent, the Lewis acid, and the additional monomer, where the amount of the lanthanide compound is less than 10 mmol per 100 gram of the total monomer to be polymerized, and where the molar ratio of the Lewis acid, if introduced, to the lanthanide compound is less than 0.25:1; (iii) introducing, independent of said step (ii), a chlorine-containing compound and optionally an alkylating agent to the monomer to be polymerized, where the molar ratio of the chlorine-containing compound introduced in step (iii) to the lanthanide compound introduced in step (ii) is at least 0.5:1; and (iv) optionally introducing, independent of said steps (ii) and (iii), an alkylating agent to the monomer to be polymerized, with the proviso that an alkylating agent is introduced to the monomer to be polymerized in at least one of said steps (ii), (iii), and (iv); whereby said steps (i), (ii), (iii), and (iv) form a polymerization mixture that includes less than 20% by weight of solvent based on the total weight of the polymerization mixture.

DETAILED DESCRIPTION OF ILLUSTRATIVE EMBODIMENTS

According to one or more embodiments of the present invention, polydienes are produced by polymerizing conjugated diene monomer in a bulk polymerization process with a lanthanide-based catalyst system that includes the combination of or reaction product of (a) a lanthanide compound selected from the group consisting of lanthanide organophosphates, lanthanide organophosphonates, and lanthanide organophosphinates, (b) an alkylating agent, and (c) a chlorine-containing compound. In one or more embodiments, the lanthanide-based catalyst system is formed in situ within a polymerization mixture that includes less than 20% by weight of organic solvent based on the total weight of monomer, organic solvent, and resulting polymer. The polydienes produced by one or more embodiments of this invention are advantageously characterized by a high cis-1,4-linkage content and a narrow molecular weight distribution.

In one or more embodiments, where the lanthanide compound and/or alkylating agent include one or more labile chlorine atoms, the catalyst system need not include a separate chlorine-containing compound; e.g., the catalyst may simply include a chlorinated lanthanide organophosphate compound and an alkylating agent. In certain embodiments, the alkylating agent may include both an aluminoxane and at least one other organoaluminum compound. In one embodiment, where the alkylating agent includes an organoaluminum hydride compound, the chlorine-containing compound may be a tin chloride compound as disclosed in U.S. Pat. No. 7,008,899, which is incorporated herein by reference. In these or other embodiments, other organometallic compounds, Lewis bases, and/or catalyst modifiers may be employed in addition to the ingredients or components set forth above. For example, in one embodiment, a nickel-containing compound may be employed as a molecular weight regulator as disclosed in U.S. Pat. No. 6,699,813, which is incorporated herein by reference.

In one or more embodiments, polydienes are produced according to the present invention by introducing (a) conjugated diene monomer, (b) a lanthanide compound selected from the group consisting of lanthanide organophosphates, lanthanide organophosphonates, and lanthanide organophosphinates, (c) an alkylating agent, and (d) a chlorine-containing compound to form a polymerization mixture that include less than 20% by weight of organic solvent based on the total weight of monomer, organic solvent, and resulting polymer.

In one or more embodiments, examples of conjugated diene monomer that can be polymerized according to the present invention include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization.

Various lanthanide compounds, or mixtures thereof, that are selected from the group of lanthanide organophosphates, lanthanide organophosphonates, and lanthanide organophosphinates can be employed.

A lanthanide organophosphate is a lanthanide metal salt of an organic phosphoric acid. In one or more embodiments, lanthanide organophosphates may be defined by the formula:

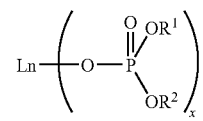

where Ln is a lanthanide atom, x is the oxidation state of the lanthanide atom, $R^1$ and $R^2$ are each independently a mono-valent organic group. In certain embodiments, $R^1$ and $R^2$ may join together to form a divalent organic group.

In one or more embodiments, mono-valent organic groups may include hydrocarbyl groups or substituted hydrocarbyl groups such as, but not limited to, alkyl, cycloalkyl, alkenyl, cycloalkenyl, aryl, allyl, aralkyl, alkaryl, or alkynyl groups. Substituted hydrocarbyl groups include hydrocarbyl groups in which one or more hydrogen atoms have been replaced by a substituent such as an alkyl group. In one or more embodiments, these groups may include from one, or the appropriate minimum number of carbon atoms to form the group, to 20 carbon atoms. These groups may also contain heteroatoms such as, but not limited to, nitrogen, boron, oxygen, silicon, sulfur, tin, and phosphorus atoms.

In one or more embodiments, divalent organic groups may include hydrocarbylene groups or substituted hydrocarbylene groups such as, but not limited to, alkylene, cycloalkylene, alkenylene, cycloalkenylene, alkynylene, cycloalkynylene, or arylene groups. Substituted hydrocarbylene groups include hydrocarbylene groups in which one or more hydrogen atoms have been replaced by a substituent such as an alkyl group. In one or more embodiments, these groups may include two, or the appropriate minimum number of carbon atoms to form the group, to 20 carbon atoms. These groups may also contain one or more heteroatoms such as, but not limited to, nitrogen, oxygen, boron, silicon, sulfur, tin, and phosphorus atoms.

A lanthanide organophosphonate is a lanthanide metal salt of an organic phosphonic acid. In one or more embodiments, lanthanide organophosphonates may be defined by the formula:

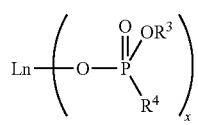

where Ln is a lanthanide atom, x is the oxidation state of the lanthanide atom, $R^3$ is a mono-valent organic group, and $R^4$ is a hydrogen atom or a mono-valent organic group. In certain embodiments, $R^3$ and $R^4$ may join together to form a divalent organic group. Examples of mono-valent organic groups and divalent organic groups are described above.

A lanthanide organophosphinate is a lanthanide metal salt of an organic phosphinic acid. In one or more embodiments, lanthanide organophosphinates may be defined by the formula:

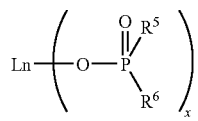

where Ln is a lanthanide atom, x is the oxidation state of the lanthanide atom, $R^5$ is a mono-valent organic group, and $R^6$ is a hydrogen atom or a mono-valent organic group. In certain embodiments, $R^5$ and $R^6$ may join together to form a divalent organic group. Examples of mono-valent organic groups and divalent organic groups are described above.

In one or more embodiments, the lanthanide organophosphates, lanthanide organophosphonates, and lanthanide organophosphinates may be soluble in hydrocarbon solvents such as aromatic hydrocarbons, aliphatic hydrocarbons, or cycloaliphatic hydrocarbons. In other embodiments, these compounds can be suspended in the polymerization medium to form the catalytically active species.

The lanthanide organophosphates, lanthanide organophosphonates, and lanthanide organophosphinates may include at least one atom of lanthanum, neodymium, cerium, praseodymium, promethium, samarium, europium, gadolinium, terbium, dysprosium, holmium, erbium, thulium, ytterbium, lutetium, and didymium. Didymium may include a commercial mixture of rare-earth elements obtained from monazite sand. The lanthanide atom in the lanthanide compounds can be in various oxidation states including but not limited to the +2, +3, and +4 oxidation states.

Without wishing to limit the practice of the present invention, further discussion will focus on neodymium compounds, although those skilled in the art will be able to select similar compounds that are based upon other lanthanide metals.

Examples of neodymium organophosphates include neodymium dibutyl phosphate, neodymium dipentyl phosphate, neodymium dihexyl phosphate, neodymium diheptyl phosphate, neodymium dioctyl phosphate, neodymium bis(1-methylheptyl)phosphate, neodymium bis(2-ethylhexyl) phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl)phosphate, neodymium butyl(2-ethylhexyl)phosphate, neodymium(1-methylheptyl)(2-ethylhexyl)phosphate, and neodymium(2-ethylhexyl)(p-nonylphenyl)phosphate.

Examples of neodymium organophosphonates include neodymium butyl phosphonate, neodymium pentyl phosphonate, neodymium hexyl phosphonate, neodymium heptyl phosphonate, neodymium octyl phosphonate, neodymium(1-methylheptyl)phosphonate, neodymium(2-ethylhexyl)phosphonate, neodymium decyl phosphonate, neodymium dodecyl phosphonate, neodymium octadecyl phosphonate, neodymium oleyl phosphonate, neodymium phenyl phosphonate, neodymium(p-nonylphenyl)phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium(1-methylheptyl)(1-methylheptyl)phosphonate, neodymium(2-ethylhexyl)(2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium(p-nonylphenyl)(p-nonylphenyl)phosphonate, neodymium butyl(2-ethylhexyl)phosphonate, neodymium (2-ethylhexyl)butylphosphonate, neodymium(1-methylheptyl)(2-ethylhexyl)phosphonate, neodymium(2-ethylhexyl)(1-methylheptyl)phosphonate, neodymium(2-ethylhexyl)(p-nonylphenyl)phosphonate, and neodymium(p-nonylphenyl)(2-ethylhexyl)phosphonate.

Examples of neodymium organophosphinates include neodymium butylphosphinate, neodymium pentylphosphinate, neodymium hexylphosphinate, neodymium heptylphosphinate, neodymium octylphosphinate, neodymium (1-methylheptyl)phosphinate, neodymium(2-ethylhexyl) phosphinate, neodymium decylphosphinate, neodymium dodecylphosphinate, neodymium octadecylphosphinate, neodymium oleylphosphinate, neodymium phenylphosphinate, neodymium(p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl) phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl)phosphinate, neodymium butyl(2-ethylhexyl)phosphinate, neodymium(1-methylheptyl)(2-ethylhexyl)phosphinate, and neodymium(2-ethylhexyl)(p-nonylphenyl)phosphinate.

Lanthanide organophosphates, lanthanide organophosphonates, and lanthanide organophosphinates can form highly viscous solutions upon addition to certain solvents or upon preparation in solvents. These solutions may be difficult to transfer and difficult to mix with other catalyst components or the monomer to be polymerized. If an insufficient amount of time is allowed for the viscous solutions to mix with other catalyst components or the monomer, poor and inconsistent results may be obtained along with reactor fouling due to the undesirable build-up of insoluble gelled polymer within the reactor. Thus, in one or more embodiments, the lanthanide organophosphates, lanthanide organophosphonates, and/or lanthanide organophosphinates are added to the monomer to be polymerized prior to the addition of the alkylating agent and/or the chlorine-containing compound. Then, a sufficient amount of mixing time is provided to disperse a gel or viscous solution of the lanthanide compound into the monomer to be polymerized. The amount of time and/or the degree of mixing may vary based upon a number of parameters, but those skilled in the art will be able to readily appreciate when sufficient dispersion of the gel or viscous solution is achieved.

In other embodiments, it has been found to be advantageous to add a Lewis acid to the solutions of the lanthanide compounds to reduce the viscosities of these solutions before employing them in polymerization. These modified solutions of the lanthanide compounds are easy to transfer and easy to mix with other catalyst components or the monomer without the need to employ a long mixing time. In addition, the use of these modified solutions of the lanthanide compounds lead to consistent polymerization results and reduced reactor fouling.

Suitable Lewis acids may include transition metal halides, halides of the elements of Groups 2, 12, 13, 14, and 15 of the IUPAC Periodic Table, and organometallic halides in which the metal atom belongs to the elements of Groups 2, 12, 13, or 14 of the IUPAC Periodic Table. Specific examples of suitable Lewis acids include methylaluminum dichloride, methylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesquibromide, methylaluminum sesquichloride, ethylaluminum sesquibromide, ethylaluminum sesquichloride, dibutyltin dichloride, aluminum trichloride, aluminum tribromide, antimony trichloride, antimony pentachloride, phosphorus trichloride, phosphorus pentachloride, boron trifluoride, boron trichloride, boron tribromide, gallium trichloride, indium trichloride, zinc dichloride, magnesium dichloride, magnesium dibromide, titanium tetrachloride, and tin tetrachloride.

In preparing a low-viscosity solution of a lanthanide compound, the lanthanide compound, solvent, and/or monomer, as well as the Lewis acid, can be introduced by using various techniques or orders of addition. In one or more embodiments, the lanthanide compound is swelled or dissolved in a solvent or monomer to form a gel or a viscous solution, and then the Lewis acid, which is either in its neat state or in a solution, is added to the gel or viscous solution containing the lanthanide compound. Additional solvent may optionally be added to the solution. The resulting mixture containing the lanthanide compound, the Lewis acid, and the solvent or monomer is agitated to form a solution having reduced viscosity.

In one or more embodiments, the concentration of the low-viscosity solution of the lanthanide compound modified with a Lewis acid is in the range of from about 0.1 to about 1.0 M (mole/liter), in other embodiments from about 0.02 to about 0.4 M, and in other embodiments from about 0.03 to about 0.1 M with reference to the lanthanide metal.

In one or more embodiments, the Lewis acid is added in an amount sufficient to form a solution having a Brookfield viscosity of less than 50,000 centipoise (cps), in other embodiments less than 10,000 cps, in other embodiments less than 1,000 cps, in other embodiments less than 500 cps, and in still other embodiments less than 100 cps.

In one or more embodiments, the molar ratio of the Lewis acid to the lanthanide compound is from about 0.001:1 to about 5:1, in other embodiments from about 0.003:1 to about 0.5:1, in other embodiments from about 0.005:1 to about 0.25:1, and in other embodiments from about 0.007:1 to about 0.1:1.

Various alkylating agents, or mixtures thereof, can be used. In one or more embodiments, alkylating agents, which may also be referred to as hydrocarbylating agents, include organometallic compounds that can transfer hydrocarbyl groups to another metal. Typically, these agents include organometallic compounds of electropositive metals such as Groups 1, 2, and 3 metals (Groups IA, IIA, and IIIA metals). In one or more embodiments, alkylating agents include organoaluminum and organomagnesium compounds. Where the alkylating agent includes a labile chlorine atom, the alkylating agent may also serve as the chlorine-containing compound.

The term "organoaluminum compound" may refer to any aluminum compound containing at least one aluminum-carbon bond. In one or more embodiments, organoaluminum compounds may be soluble in a hydrocarbon solvent.

In one or more embodiments, organoaluminum compounds include those represented by the formula $AlR_nX_{3-n}$, where each R, which may be the same or different, is a mono-valent organic group that is attached to the aluminum atom via a carbon atom, where each X, which may be the same or different, is a hydrogen atom, a chlorine atom, a carboxylate group, an alkoxide group, or an aryloxide group, and where n is an integer of 1 to 3. In one or more embodiments, each R may be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, sulfur, and phosphorus atoms.

Examples of organoaluminum compounds include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum chloride, hydrocarbylaluminum dichloride, dihydrocarbylaluminum aryloxide, and hydrocarbylaluminum diaryloxide compounds.

Examples of trihydrocarbylaluminum compounds include trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Examples of dihydrocarbylaluminum hydride compounds include diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Examples of hydrocarbylaluminum dihydrides include ethylaluminum dihydride, n-propylaluminum dihydride, isopropylaluminum dihydride, n-butylaluminum dihydride, isobutylaluminum dihydride, and n-octylaluminum dihydride.

Examples of dihydrocarbylaluminum chloride compounds include diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Examples of hydrocarbylaluminum dichloride include ethylaluminum dichloride, n-propylaluminum dichloride, isopropylaluminum dichloride, n-butylaluminum dichloride, isobutylaluminum dichloride, and n-octylaluminum dichloride.

Examples of other organoaluminum compounds include dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Another class of organoaluminum compounds include aluminoxanes. Aluminoxanes include oligomeric linear aluminoxanes that can be represented by the general formula:

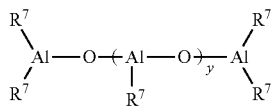

and oligomeric cyclic aluminoxanes that can be represented by the general formula:

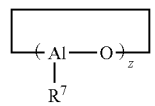

where y may be an integer of 1 to about 100, and in other embodiments about 10 to about 50; z may be an integer of 2 to about 100, and in other embodiments about 3 to about 20; and where each $R^7$, which may be the same or different, may be a mono-valent organic group that is attached to the aluminum atom via a carbon atom. In one or more embodiments, each $R^7$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting trihydrocarbylaluminum compounds with water. This reaction can be performed according to known methods, such as (1) a method in which the trihydrocarbylaluminum compound may be dissolved in an organic solvent and then contacted with water, (2) a method in which the trihydrocarbylaluminum compound may be reacted with water of crystallization contained in, for example, metal salts, or water adsorbed in inorganic or organic compounds, and (3) a method in which the trihydrocarbylaluminum compound may be reacted with water in the presence of the monomer or monomer solution that is to be polymerized.

Examples of aluminoxane compounds include methylaluminoxane (MAO), modified methylaluminoxane (MMAO), ethylaluminoxane, n-propylaluminoxane, isopropylaluminoxane, n-butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, 2,6-dimethylphenylaluminoxane, and the like, and mixtures thereof. Modified methylaluminoxane can be formed by substituting about 20-80% of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one embodiment, methylaluminoxane and at least one other organoaluminum compound (e.g., $AlR_nX_{3-n}$), such as diisobutyl aluminum hydride, are employed in combination.

The term organomagnesium compound may refer to any magnesium compound that contains at least one magnesium-carbon bond. Organomagnesium compounds may be soluble in a hydrocarbon solvent. One class of organomagnesium compounds that can be utilized may be represented by the formula $MgR_2$, where each R, which may be the same or different, is a mono-valent organic group, with the proviso that the group is attached to the magnesium atom via a carbon atom. In one or more embodiments, each R may be a hydrocarbyl group, and the resulting organomagnesium compounds are dihydrocarbylmagnesium compounds. Examples of the hydrocarbyl groups include, but are not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups. These hydrocarbyl groups may contain heteroatoms such as, but not limited to, nitrogen, oxygen, silicon, sulfur, and phosphorus atom.

Examples of suitable dihydrocarbylmagnesium compounds include diethylmagnesium, di-n-propylmagnesium, diisopropylmagnesium, dibutylmagnesium, dihexylmagnesium, diphenylmagnesium, dibenzylmagnesium, and mixtures thereof.

Another class of organomagnesium compounds that can be utilized include those that may be represented by the formula RMgX, where R is a mono-valent organic group, with the proviso that the group is attached to the magnesium atom via a carbon atom, and X is a hydrogen atom, a chlorine atom, a carboxylate group, an alkoxide group, or an aryloxide group. In one or more embodiments, R may be a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups. These hydrocarbyl groups may contain heteroatoms such as, but not limited to, nitrogen, oxygen, boron, silicon, sulfur, and phosphorus atoms. In one or more embodiments, X is a carboxylate group, an alkoxide group, or an aryloxide group.

Exemplary types of organomagnesium compounds that can be represented by the formula RMgX include, but are not limited to, hydrocarbylmagnesium hydride, hydrocarbylmagnesium chloride, hydrocarbylmagnesium carboxylate, hydrocarbylmagnesium alkoxide, hydrocarbylmagnesium aryloxide, and mixtures thereof.

Specific examples of organomagnesium compounds that may be represented by the formula RMgX include methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, benzylmagnesium phenoxide, and the like, and mixtures thereof.

Various chlorine-containing compounds, or mixtures thereof, that contain one or more labile chlorine atoms can be employed. A combination of two or more chlorine-containing compounds can also be utilized. In one or more embodiments, the chlorine-containing compounds may be soluble in a hydrocarbon solvent. In other embodiments, hydrocarbon-insoluble chlorine-containing compounds, which can be suspended in the polymerization medium to form the catalytically active species, may be useful.

Suitable types of chlorine-containing compounds include, but are not limited to, elemental chlorine, hydrogen chlorides, organic chlorides, inorganic chlorides, metallic chlorides, organometallic chlorides, and mixtures thereof.

Examples of organic chlorides include t-butyl chloride, allyl chloride, benzyl chloride, diphenylmethyl chloride, triphenylmethyl chloride, benzylidene chloride, methyltrichlorosilane, phenyltrichlorosilane, dimethyldichlorosilane, diphenyldichlorosilane, trimethylchlorosilane, benzoyl chloride, propionyl chloride, and methyl chloroformate.

Examples of inorganic chlorides include phosphorus trichloride, phosphorus pentachloride, phosphorus oxychloride, boron trichloride, silicon tetrachloride, arsenic trichloride, selenium tetrachloride, and tellurium tetrachloride.

Examples of metallic chlorides include tin tetrachloride, aluminum trichloride, antimony trichloride, antimony pentachloride, gallium trichloride, indium trichloride, titanium tetrachloride, and zinc dichloride.

Examples of organometallic chlorides include organoaluminum chlorides such as dimethylaluminum chloride, diethylaluminum chloride, methylaluminum dichloride, ethylaluminum dichloride, methylaluminum sesquichloride, ethylaluminum sesquichloride, and isobutylaluminum sesquichloride; organomagnesium chlorides such as methylmagnesium chloride, ethylmagnesium chloride, n-butylmagnesium chloride, phenylmagnesium chloride, and benzylmagnesium chloride; and organotin chlorides such as trimethyltin chloride, triethyltin chloride, di-n-butyltin dichloride, di-t-butyltin dichloride, and tri-n-butyltin chloride.

In one embodiment, an organic chloride is employed as the chlorine-containing compound of the catalyst system. In another embodiment, a metallic chloride is employed as the chlorine-containing compound of the catalyst system. In still another embodiment, an organometallic chloride is employed as the chlorine-containing compound of the catalyst system. In one or more embodiments, such as where the catalyst is preformed as described herein below, the chlorine-containing compound of the catalyst system is not an organoaluminum chloride. In a further embodiment, where the alkylating agent is an organoaluminum chloride compound, the chlorine-containing compound of the catalyst system may be a tin chloride such as tin tetrachloride or tin dichloride.

The catalyst composition of this invention may be formed by combining or mixing the foregoing catalyst ingredients. Although one or more active catalyst species are believed to result from the combination of the catalyst ingredients, the degree of interaction or reaction between the various catalyst ingredients or components is not known with any great degree of certainty. The combination of or reaction product of the lanthanide compound, the alkylating agent, and the chlorine-containing compound is conventionally referred to as a catalyst system or catalyst composition. The term catalyst composition or catalyst system may be employed to encompass a simple mixture of the ingredients, a complex of the various ingredients that is caused by physical or chemical forces of attraction, a chemical reaction product of the ingredients, or a combination of the foregoing.

The catalyst composition of this invention advantageously has a technologically useful catalytic activity for polymerizing conjugated dienes into polydienes over a wide range of catalyst concentrations and catalyst ingredient ratios. Several factors may impact the optimum concentration of any one of the catalyst ingredients. For example, because the catalyst ingredients may interact to form an active species, the optimum concentration for any one catalyst ingredient may be dependent upon the concentrations of the other catalyst ingredients.

In one or more embodiments, the molar ratio of the alkylating agent to the lanthanide compound (alkylating agent/Ln) can be varied from about 1:1 to about 1,000:1, in other embodiments from about 2:1 to about 500:1, and in other embodiments from about 5:1 to about 200:1.

In those embodiments where both an aluminoxane and at least one other organoaluminum agent are employed as alkylating agents, the molar ratio of the aluminoxane to the lanthanide compound (aluminoxane/Ln) can be varied from 5:1 to about 1,000:1, in other embodiments from about 10:1 to about 700:1, and in other embodiments from about 20:1 to about 500:1; and the molar ratio of the at least one other organoaluminum compound to the lanthanide compound (Al/Ln) can be varied from about 1:1 to about 200:1, in other embodiments from about 2:1 to about 150:1, and in other embodiments from about 5:1 to about 100:1.

The molar ratio of the chlorine-containing compound to the lanthanide compound is best described in terms of the ratio of the moles of chlorine atoms in the chlorine-containing compound to the moles of lanthanide atoms in the lanthanide compound (Cl/Ln). In one or more embodiments, the chlorine/Ln molar ratio can be varied from about 0.5:1 to about 20:1, in other embodiments from about 1:1 to about 10:1, and in other embodiments from about 2:1 to about 6:1.

The lanthanide-based catalyst can be formed by employing several techniques. In one or more embodiments, the catalyst may be formed by adding the catalyst components directly to the monomer to be polymerized. In this respect, the catalyst components may be added either in a stepwise or simultaneous manner. In one embodiment, when the catalyst ingredients are added in a stepwise manner, the lanthanide compound can be added first, followed by the alkylating agent, and ultimately followed by the chlorine-containing compound. In other embodiments, a Lewis acid is added directly to the monomer to be polymerized. The addition of the catalyst components directly to the monomer to be polymerized may be referred to as an in situ formation of the catalyst system. While the various catalyst components may be added directly and independently to the monomer to be polymerized, the lanthanide compound may be added simultaneously with or as a pre-combined solution with the Lewis acid as described above.

In other embodiments, the catalyst or a portion thereof may be preformed. That is, two or more of the catalyst ingredients may be introduced and pre-mixed outside of the monomer to be polymerized. In particular embodiments, the preformation of the catalyst may occur either in the absence of any monomer or in the presence of a small amount of at least one conjugated diene monomer at an appropriate temperature, which is generally from about −20° C. to about 80° C. Mixtures of conjugated diene monomers may also be used. The amount of conjugated diene monomer that may be used for preforming the catalyst can range from about 1 to about 500 moles, in other embodiments from about 5 to about 250 moles, and in other embodiments from about 10 to about 100 moles per mole of the lanthanide compound. The resulting preformed catalyst composition can be aged, if desired, prior to being added to the monomer that is to be polymerized.

In other embodiments, the catalyst may be formed by using a two-stage procedure. The first stage can involve combining the lanthanide compound with the alkylating agent and a Lewis acid either in the absence of any monomer or in the presence of a small amount of at least one conjugated diene monomer at an appropriate temperature (e.g., −20° C. to about 80° C.). In preparing this first-stage mixture, the amount of monomer employed may be similar to that set forth above for preforming the catalyst, and the molar ratio of the Lewis acid to the lanthanide compounds may be maintained at levels below 0.25:1 as set forth above. In the second stage, the mixture prepared in the first stage and the chlorine-containing compound can be added in either a stepwise or simultaneous manner to the monomer that is to be polymerized. In one embodiment, the mixture prepared in the first stage can be added first, followed by the chlorine-containing compound.

In one or more embodiments, a solvent may be employed as a carrier to either dissolve or suspend the catalyst or catalyst ingredients in order to facilitate the delivery of the catalyst or catalyst ingredients to the polymerization system. In other embodiments, conjugated diene monomer can be used as the catalyst carrier. In yet other embodiments, the catalyst ingredients can be used in their neat state without any solvent.

In one or more embodiments, suitable solvents include those organic compounds that will not undergo polymerization or incorporation into propagating polymer chains during the polymerization of monomer in the presence of catalyst. In one or more embodiments, these organic solvents are inert to the catalyst. In one or more embodiments, these organic solvent are liquid at ambient temperature and pressure. Exemplary organic solvents include hydrocarbons with a low or relatively low boiling point such as aromatic hydrocarbons, aliphatic hydrocarbons, and cycloaliphatic hydrocarbons.

Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization.

Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and remain incorporated in the polymer.

The production of polydienes according to this invention can be accomplished by polymerizing conjugated diene monomer in the presence of a catalytically effective amount of the foregoing catalyst composition. The introduction of the catalyst composition, the conjugated diene monomer, and any solvent if employed forms a polymerization mixture in which the polymer product is formed. The total catalyst concentration to be employed in the polymerization mixture may depend on the interplay of various factors such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients can be used. In one or more embodiments, the amount of the lanthanide compound used can be varied from about 0.001 to about 10 mmol, in other embodiments from about 0.002 to about 1 mmol, in other embodiments from about 0.005 to about 0.5 mmol, and in other embodiments from about 0.01 to about 0.2 mmol per 100 g of conjugated diene monomer. In one or more embodiments, the concentration of the lanthanide compound within polymerization mixture is less than 0.01 mol/l, in other embodiments less than 0.008 mol/l, in other embodiments less than 0.005 mol/l, and in other embodiments less than 0.003 mol/l.

In one or more embodiments, the polymerization system employed in the present invention may be generally considered a bulk polymerization system that includes substantially no solvent or a minimal amount of solvent. Those skilled in the art will appreciate the benefits of bulk polymerization processes (i.e., processes where monomer acts as the solvent), and therefore the polymerization system includes less solvent than will deleteriously impact the benefits sought by conducting bulk polymerization. In one or more embodiments, the solvent content of the polymerization mixture may be less than about 20% by weight, in other embodiments less than about 10% by weight, and in still other embodiments less than about 5% by weight based on the total weight of the polymerization mixture. In another embodiment, the polymerization mixture contains no solvents other than those that are inherent to the raw materials employed. In still another embodiment, the polymerization mixture is substantially devoid of solvent, which refers to the absence of that amount of solvent that would otherwise have an appreciable impact on the polymerization process. Polymerization systems that are substantially devoid of solvent may be referred to as including substantially no solvent. In particular embodiments, the polymerization mixture is devoid of solvent.

The bulk polymerization may be conducted in conventional polymerization vessels known in the art. In one or more embodiments, the bulk polymerization can be conducted in a conventional stirred-tank reactor, especially if the monomer conversion is less than about 60%. In still other embodiments, especially where the monomer conversion is higher than about 60%, which typically results in a highly viscous cement, the bulk polymerization may be conducted in an elongated reactor in which the viscous cement under polymerization is driven to move by piston, or substantially by piston. For example, extruders in which the cement is pushed along by a self-cleaning single-screw or double-screw agitator are suitable for this purpose. Examples of useful bulk polymerization processes are disclosed in U.S. Pat. No. 7,351,776, which is incorporated herein by reference.

In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted.

The bulk polymerization can be carried out as a batch process, a continuous process, or a semi-continuous process. In the semi-continuous process, the monomer is intermittently charged as needed to replace that monomer already polymerized. The polymerization temperature may be varied. However, due to the limited solubility of cis-1,4-polybutadiene in 1,3-butadiene monomer at elevated temperatures, it is preferable to employ a relatively low polymerization temperature in order to maintain the polymerization mass in a single-phase homogeneous system, which allows the polymer molecular weight to be rigorously controlled and gives a uniform polymer product. In one or more embodiments, the conditions under which the polymerization proceeds may be controlled to maintain the temperature of the polymerization mixture within a range from about 0° C. to about 50° C., in other embodiments from about 5° C. to about 45° C., and in other embodiments from about 10° C. to about 40° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, conditions may be controlled to conduct the polymerization under a pressure of from about 0.1 atmosphere to about 50 atmospheres, in other embodiments from about 0.5 atmosphere to about 20 atmospheres, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

The polymerization can be carried out to any desired conversions before the polymerization is terminated. In one or more embodiments, however, it may be desirable to avoid the high cement viscosity resulting from high conversions, as well as the possible separation of polymer as a solid phase from the monomer at high conversions due to the limited solubility of, for example, cis-1,4-polybutadiene, in monomer. Accordingly, in one embodiment, the conversion is in the range of from about 5% to about 60%. In another embodiment, the conversion is from about 10% to about 40%. In still another embodiment, the conversion is from about 15% to about 30%. The unreacted monomer can later be recycled back to the process.

The polydienes produced by the polymerization process of this invention may possess pseudo-living characteristics, such that some of polymer chains in these polymers have reactive chain ends. Once a desired monomer conversion is achieved, a functionalizing agent may optionally be introduced into the polymerization mixture to react with any reactive polymer chains so as to give a functionalized polymer. In one or more embodiments, the functionalizing agent is introduced prior to contacting the polymerization mixture with a quenching agent. In other embodiments, the functionalizing may be introduced after the polymerization mixture has been partially quenched with a quenching agent.

In one or more embodiments, functionalizing agents include compounds or reagents that can react with a reactive polymer produced by this invention and thereby provide the polymer with a functional group that is distinct from a propagating chain that has not been reacted with the functionalizing agent. The functional group may be reactive or interactive with other polymer chains (propagating and/or non-propagating) or with other constituents such as reinforcing fillers (e.g. carbon black) that may be combined with the polymer. In one or more embodiments, the reaction between the functionalizing agent and the reactive polymer proceeds via an addition or substitution reaction.

Useful functionalizing agents may include compounds that provide a functional group at the end of a polymer chain without joining two or more polymer chains together, as well as compounds that couple or join two or more polymer chains together via a functional linkage to form a single macromolecule. The latter type of functionalizing agents may also be referred to as coupling agents.

In one or more embodiments, functionalizing agents include compounds that will add or impart a heteroatom to the polymer chain. In particular embodiments, functionalizing agents include those compounds that will impart a functional group to the polymer chain to form a functionalized polymer that reduces the 50° C. hysteresis loss of a carbon-black filled vulcanizates prepared from the functionalized polymer as compared to similar carbon-black filled vulcanizates prepared from non-functionalized polymer. In one or more embodiments, this reduction in hysteresis loss is at least 5%, in other embodiments at least 10%, and in other embodiments at least 15%.

In one or more embodiments, suitable functionalizing agents include those compounds that contain groups that may react with pseudo-living polymers (e.g., those produced in accordance with this invention). Exemplary functionalizing agents include ketones, quinones, aldehydes, amides, esters, isocyanates, isothiocyanates, epoxides, imines, aminoketones, aminothioketones, and acid anhydrides. Examples of these compounds are disclosed in U.S. Pat. Nos. 4,906,706, 4,990,573, 5,064,910, 5,567,784, 5,844,050, 6,838,526, 6,977,281, and 6,992,147; U.S. Pat. Publication Nos. 2006/0004131 A1, 2006/0025539 A1, 2006/0030677 A1, and 2004/0147694 A1; Japanese Patent Application Nos. 05-051406A, 05-059103A, 10-306113A, and 11-035633A; which are incorporated herein by reference. Other examples of functionalizing agents include azine compounds as described in U.S. Ser. No. 11/640,711, hydrobenzamide compounds as disclosed in U.S. Ser. No. 11/710,713, nitro compounds as disclosed in U.S. Ser. No. 11/710,845, and protected oxime compounds as disclosed in U.S. Ser. No. 60/875, 484, all of which are incorporated herein by reference.

In particular embodiments, the functionalizing agents employed may be coupling agents which include, but are not limited to, metal halides such as tin tetrachloride, metalloid halides such as silicon tetrachloride, metal ester-carboxylate complexes such as dioctyltin bis(octylmaleate), alkoxysilanes such as tetraethyl orthosilicate, and alkoxystannanes such as tetraethoxytin. Coupling agents can be employed either alone or in combination with other functionalizing agents. The combination of functionalizing agents may be used in any molar ratio.

The amount of functionalizing agent introduced to the polymerization mixture may depend upon various factors including the type and amount of catalyst used to initiate the polymerization, the type of functionalizing agent, the desired level of functionality and many other factors. In one or more embodiments, the amount of functionalizing agent may be in a range of from about 1 to about 200 moles, in other embodiments from about 5 to about 150 moles, and in other embodiments from about 10 to about 100 moles per mole of the lanthanide compound.

Because reactive polymer chains may slowly self-terminate at high temperatures, in one embodiment the functionalizing agent may be added to the polymerization mixture once a peak polymerization temperature is observed. In other embodiments, the functionalizing agent may be added within about 25 to 35 minutes after the peak polymerization temperature is reached.

In one or more embodiments, the functionalizing agent may be introduced to the polymerization mixture after a desired monomer conversion is achieved but before a quenching agent containing a protic hydrogen atom is added. In one or more embodiments, the functionalizing agent is added to the polymerization mixture after a monomer conversion of at least 5%, in other embodiments at least 10%, in other embodiments at least 20%, in other embodiments at least 50%, and in other embodiments at least 80%. In these or other embodiments, the functionalizing agent is added to the polymerization mixture prior to a monomer conversion of 90%, in other embodiments prior to 70% monomer conversion, in other embodiments prior to 50% monomer conversion, in other embodiments prior to 20% monomer conversion, and in other embodiments prior to 15%. In one or more embodiments, the functionalizing agent is added after complete, or substantially complete monomer conversion. In particular embodiments, a functionalizing agent may be introduced to the polymerization mixture immediately prior to, together with, or after the introduction of a Lewis base as disclosed in co-pending U.S. Ser. No. 11/890,590, filed on Aug. 7, 2007, which is incorporated herein by reference.

In one or more embodiments, the functionalizing agent may be introduced to the polymerization mixture at a location (e.g., within a vessel) where the polymerization (or at least a portion thereof) has been conducted. In other embodiments, the functionalizing agent may be introduced to the polymerization mixture at a location that is distinct from where the polymerization (or at least a portion thereof) has taken place. For example, the functionalizing agent may be introduced to the polymerization mixture in downstream vessels including downstream reactors or tanks, in-line reactors or mixers, extruders, or devolatilizers.

Once a functionalizing agent has been introduced to the polymerization mixture and a desired reaction time has been provided, a quenching agent may be optionally added to the polymerization mixture in order to deactivate any residual reactive polymer, catalyst, and/or catalyst components. In one or more embodiments, quenching agents include protic compounds, such as, but not limited to, alcohols, carboxylic acids, inorganic acids, or a mixture thereof. In particular embodiments, the quenching agent includes a polyhydroxy compound as disclosed in co-pending U.S. Ser. No. 11/890,591, filed on Aug. 7, 2007, which is incorporated herein by reference.

An antioxidant such as 2,6-di-t-butyl-4-methylphenol may be added along with, before, or after the addition of the quenching agent. The amount of the antioxidant employed may be in the range of about 0.2% to about 1% by weight of the polymer product. The quenching agent and the antioxidant may be added as neat materials or, if necessary, dissolved in a hydrocarbon solvent or conjugated diene monomer prior to being added to the polymerization mixture.

Once the polymerization mixture has been quenched, the various constituents of the polymerization mixture may be recovered. In one or more embodiments, the unreacted monomer can be recovered from the polymerization mixture. For example, the monomer can be distilled from the polymerization mixture by using techniques known in the art. In one or more embodiments, a devolatilizer may be employed to remove the monomer from the polymerization mixture. Once the monomer has been removed from the polymerization mixture, the monomer may be purified, stored, and/or recycled back to the polymerization process.

The polymer product may be recovered from the polymerization mixture by using techniques known in the art. In one or more embodiments, desolventization and drying techniques may be used. For instance, the polymer can be recovered by passing the polymerization mixture through a heated screw apparatus, such as a desolventizing extruder, in which the volatile substances are removed by evaporation at appropriate temperatures (e.g., about 100° C. to about 170° C.) and under atmospheric or sub-atmospheric pressure. This treatment serves to remove unreacted monomer as well as any low-boiling solvent. Alternatively, the polymer can also be recovered by subjecting the polymerization mixture to steam desolventization, followed by drying the resulting polymer crumbs in a hot air tunnel. The polymer can also be recovered by directly drying the polymerization mixture on a drum dryer.

Where cis-1,4-polydienes (e.g., cis-1,4-polybutadiene) are produced by one or more embodiments of the process of this invention, the cis-1,4-polydienes may advantageously have a cis-1,4 linkage content in excess of 96%, in other embodiments in excess of 97%, in other embodiments in excess of 98%, in other embodiments in excess of 98.5%, and in other embodiments in excess of 99%.

In one or more embodiments, the polydienes produced by the process of the present invention exhibit a molecular weight distribution ($M_w/M_n$) of less than about 2.7, in other embodiments less than about 2.5, in yet other embodiments less than about 2.2, and in still other embodiments less than about 2.0.

In particular embodiments, the cis-1,4-polydienes produced by the process of present invention have a cis-1,4-linkage content of greater than 98.5% and a molecular weight distribution of less than 2.0. This is advantageous because cis-1,4-polydienes having a narrower molecular weight distribution give lower hysteresis, whereas cis-1,4-polydienes having a higher cis-1,4-linkage content exhibit the increased ability to undergo strain-induced crystallization and thus give superior physical properties such as higher tensile strength and higher abrasion resistance.

The cis-1,4-polydienes produced by the process of the present invention exhibit excellent viscoelastic properties and are particularly useful in the manufacture of various tire components including, but not limited to, tire treads, sidewalls, subtreads, and bead fillers. The cis-1,4-polydienes can be used as all or part of the elastomeric component of a tire stock. When the cis-1,4-polydienes are used in conjunction with other rubbers to form the elastomeric component of a tire stock, these other rubbers may be natural rubber, synthetic rubbers, and mixtures thereof. Examples of synthetic rubber include polyisoprene, poly(styrene-co-butadiene), polybutadiene with low cis-1,4-linkage content, poly(styrene-co-butadiene-co-isoprene), and mixtures thereof. The cis-1,4-polydienes can also be used in the manufacture of hoses, belts, shoe soles, window seals, other seals, vibration damping rubber, and other industrial products.

In order to demonstrate the practice of the present invention, the following examples have been prepared and tested. The examples should not, however, be viewed as limiting the scope of the invention. The claims will serve to define the invention.

EXAMPLES

In the following examples, the Mooney viscosities ($ML_{1+4}$) of the polymer samples were determined at 100° C. by using a Monsanto Mooney viscometer with a large rotor, a one-minute warm-up time, and a four-minute running time. The number average ($M_n$) and weight average ($M_w$) molecular weights and molecular weight distributions ($M_w/M_n$) of the polymer samples were determined by gel permeation chromatography (GPC) calibrated with polystyrene standards and Mark-Houwink constants of the polymers in question. The cis-1,4-linkage, trans-1,4-linkage, and 1,2-linkage contents of the polymer samples were determined by infrared spectroscopy.

Example 1

In this experiment, cis-1,4-polybutadiene was prepared by polymerizing 1,3-butadiene monomer in bulk with a catalyst system comprising neodymium bis(2-ethylhexyl)phosphate (abbreviated as NdP hereinafter), triisobutylaluminum (TIBA), and ethylaluminum dichloride (EADC). A commercially available 0.126 M NdP solution in methylcyclohexane was used as the NdP source. This solution was found to be highly viscous and difficult to transfer.

The polymerization reactor consisted of a one-gallon stainless-steel reactor equipped with a mechanical agitator (shaft and blades) capable of mixing high viscosity polymer cement. The top of the reactor was connected to a reflux condenser system for conveying, condensing, and recycling the 1,3-butadiene vapor developed inside the reactor throughout the duration of the polymerization. The reactor was also equipped with a cooling jacket containing cold water. The heat of polymerization was dissipated partly by internal cooling through the use of the reflux condenser system, and partly by external cooling through heat transfer to the cooling jacket.

The reactor was thoroughly purged with a stream of dry nitrogen, which was then replaced with 1,3-butadiene vapor by charging 100 g of dry 1,3-butadiene monomer to the reactor, heating the reactor to 65° C., and then venting the 1,3-butadiene vapor from the top of the reflux condenser system until no liquid 1,3-butadiene remained in the reactor. Cooling water was applied to the reflux condenser and the reactor jacket, and 1302 g of 1,3-butadiene monomer was charged into the reactor. After the monomer was thermostated at 32° C., 29.1 mL of 0.68 M TIBA in hexane was charged into the reactor, followed by the addition of 1.97 mL of 0.126 M NdP in methylcyclohexane. The polymerization was then initiated by charging 5.00 mL of 0.074 M EADC in hexane into the reactor, which occurred within 1-2 minutes from the addition of the NdP methylcyclohexane blend. After 8.9 minutes from its commencement, the polymerization was terminated by the addition of 4.56 mL of isopropanol in 1360 g of hexane. The resulting polymer cement was removed from the reactor, coagulated with 3 gallons of isopropanol containing 5 g of 2,6-di-t-butyl-4-methylphenol, and then dried on a drum dryer. The yield of the polymer was 155.4 g. The properties of the resulting polymer are summarized in Table I.

After the polymerization mixture was discharged from the reactor, visual inspection of the interior of the reactor revealed that reactor fouling had occurred. Specifically, the shaft and blades of the agitator were coated with some insoluble gelled polymer. The reactor fouling occurred because, under the above-mentioned polymerization conditions, the highly viscous NdP solution was not adequately mixed with other catalyst components and the monomer, and a portion of the NdP solution was stuck in the agitator, which caused fouling due to excessive polymerization occurring on the agitator.

TABLE I

| | Example No. | | | | |
|---|---|---|---|---|---|
| | 1 | 2 | 4 | 5 | 6 |
| Nd compound | NdP | NdP | NdP | NdV | NdP |
| Halogen compound | EADC | EADC | EADC | EADC | EADC |
| Polymerization system | bulk | bulk | bulk | bulk | solution |
| $ML_{1+4}$ | 18.6 | 17.7 | 23.1 | 20.2 | 20.7 |
| $M_n$ | 136,000 | 116,000 | 126,000 | 102,000 | 98,200 |
| $M_w$ | 246,00 | 271,000 | 252,000 | 272,000 | 195,400 |
| $M_w/M_n$ | 1.8 | 2.3 | 2.0 | 2.7 | 2.0 |
| % cis-1,4 | 98.6 | 98.5 | 98.6 | 98.6 | 96.1 |
| % trans-1,4 | 1.2 | 1.3 | 1.2 | 1.1 | 3.2 |
| % 1,2 | 0.2 | 0.2 | 0.2 | 0.3 | 0.7 |

Example 2

In this experiment, cis-1,4-polybutadiene was prepared by polymerizing 1,3-butadiene monomer in bulk with the same catalyst system as used in Example 1, except that the highly viscous NdP solution was first thoroughly pre-mixed with the monomer prior to adding other catalyst components.

The same reactor preparation procedure as used in Example 1 was used. About 651 g of 1,3-butadiene monomer was charged into the reactor. After the monomer was thermostated at 32° C., 0.98 mL of 0.126 M NdP in methylcyclohexane was charged into the reactor. After the resulting mixture was stirred for 1.5 hours to ensure the complete dissolution of the viscous NdP solution into the monomer, 7.40 mL of 1.0 M TIBA in hexane was charged into the reactor. The polymerization was then initiated by charging 2.90 mL of 0.074 M EADC in hexane into the reactor. After 11.7 minutes from its commencement, the polymerization was terminated by the addition of 4.56 mL of isopropanol in 1360 g of hexane. The resulting polymer cement was removed from the reactor, coagulated with 3 gallons of isopropanol containing 5 g of 2,6-di-t-butyl-4-methylphenol, and then dried on a drum dryer. The yield of the polymer was 61.2 g. The properties of the resulting polymer are summarized in Table I.

After the polymerization mixture was discharged from the reactor, visual inspection of the interior of the reactor revealed that the reactor was clean with no fouling.

A comparison of the results obtained in Example 2 with those obtained in Example 1 indicates that, in order to avoid reactor fouling, an adequate amount of time must be allowed for the viscous NdP solution to mix with the monomer prior to adding other catalyst components.

Examples 3

In this experiment, a low-viscosity NdP solution was prepared by treating a commercially available, high-viscosity NdP solution with a small amount of a Lewis acid.

About 0.18 mL of 1.0 M tin tetrachloride (TTC) in hexane was added to 38.1 mL of the commercially available 0.126 M NdP solution in methylcyclohexane. Upon mixing, the viscosity of the NdP solution decreased significantly, yielding a much less viscous solution. The resulting NdP solution (referred to as TTC-modified NdP solution hereinafter) had a concentration of 0.125 M. It was found that the TTC-modified NdP solution was easy to transfer and easy to mix with other catalyst components or the monomer without the need to employ a long mixing time. Therefore, the TTC-modified NdP solution was employed in subsequent polymerization experiments.

Example 4

In this experiment, cis-1,4-polybutadiene was prepared by polymerizing 1,3-butadiene monomer in bulk with a catalyst system comprising TTC-modified NdP, triisobutylaluminum (TIBA), and ethylaluminum dichloride (EADC).

A procedure similar to that used in Example 1 was employed. After the monomer was thermostated at 32° C., 20.0 mL of 0.68 M TIBA in hexane was charged into the reactor, followed by the addition of 2.00 mL of 0.125 M TTC-modified NdP in methylcyclohexane. The polymerization was then initiated by charging 5.85 mL of 0.074 M EADC in hexane into the reactor, which occurred within 1-2 minutes from the addition of the NdP methylcyclohexane blend. After 11.5 minutes from its commencement, the polymerization was terminated by the addition of 4.56 mL of isopropanol in 1360 g of hexane. The resulting polymer cement was removed from the reactor, coagulated with 3 gallons of isopropanol containing 5 g of 2,6-di-t-butyl-4-methylphenol, and then dried on a drum dryer. The yield of the polymer was 180.0 g. The properties of the resulting polymer are summarized in Table I.

After the polymerization mixture was discharged from the reactor, visual inspection of the interior of the reactor revealed that the reactor was clean with no fouling.

A comparison of the results obtained in Example 4 with those obtained in Example 1 indicates that the use of the TTC-modified NdP solution is advantageous in that no long mixing time is required and no reactor fouling occurs during the polymerization.

Example 5

Comparative Example to Examples 1, 2 and 4

In this experiment, cis-1,4-polybutadiene was prepared by polymerizing 1,3-butadiene monomer in bulk with a catalyst system comprising neodymium versatate (abbreviated as NdV hereinafter), TIBA, and EADC.

A procedure similar to that used in Example 1 was employed. After the monomer was thermostated at 32° C., 29.1 mL of 0.68 M TIBA in hexane was charged into the reactor, followed by the addition of 4.6 mL of 0.054 M NdV in cyclohexane. The polymerization was then initiated by charging 5.30 mL of 0.070 M EADC in hexane into the reactor. After 17.1 minutes from its commencement, the polymerization was terminated by the addition of 4.56 mL of isopropanol in 1360 g of hexane. The resulting polymer cement was removed from the reactor, coagulated with 3 gallons of isopropanol containing 5 g of 2,6-di-t-butyl-4-methylphenol, and then dried on a drum dryer. The yield of the polymer was 196.5 g. The properties of the resulting polymer are summarized in Table I.

A comparison of the results obtained in Example 5 with those obtained in Examples 1, 2, and 4 indicates that the use of NdP instead of NdV in the bulk polymerization of 1,3-butadiene gives rise to cis-1,4-polybutadiene having a narrower molecular weight distribution.

Example 6

Comparative Example to Example 4

In this experiment, cis-1,4-polybutadiene was prepared by polymerizing 1,3-butadiene monomer with the same catalyst system as used in Example 4, except that the polymerization was conducted in solution.

The polymerization vessel was an 800-mL glass bottle which had been washed and dried. The bottle was capped with a self-sealing rubber liner and a perforated metal cap. After the bottle was thoroughly purged with a stream of dry nitrogen, the bottle was charged with 101 g of hexanes and 232 g of a 1,3-butadiene/hexanes blend containing 21.6% by weight of 1,3-butadiene. The following catalyst ingredients were then charged into the bottle in the following order: (1) 0.68 mL of 0.125 M TTC-modified NdP in methylcyclohexane, (2) 2.37 mL of 0.68 M TIBA, and (3) 0.76 mL of 0.16 M EADC. The bottle was tumbled for 50 minutes in a water bath maintained at 80° C. The polymerization was terminated by the addition of 3 mL of isopropanol containing 0.30 g of 2,6-di-t-butyl-4-methylphenol. The resulting polymer cement was coagulated with 3 liters of isopropanol containing 0.5 g of 2,6-di-t-butyl-4-methylphenol, and then dried on a drum dryer. The yield of the polymer was 43.3 g. The properties of the resulting polymer are summarized in Table I.

A comparison of the results obtained in Example 6 with those obtained in Example 4 indicates that the use of NdP in the bulk polymerization of 1,3-butadiene gives rise to cis-1,4-polybutadiene having a higher cis-1,4-linkage content as compared to the polymer produced by the solution polymerization of 1,3-butadiene in the presence of the same catalyst system.

Example 7

In this experiment, cis-1,4-polybutadiene was prepared by polymerizing 1,3-butadiene monomer in bulk with a catalyst system comprising TTC-modified NdP, TIBA, and $SnCl_4$.

A procedure similar to that used in Example 1 was employed. After the monomer was thermostated at 32° C., 21.8 mL of 0.68 M TIBA in hexane was charged into the reactor, followed by the addition of 2.0 mL of 0.125 M TTC-modified NdP in methylcyclohexane. The polymerization was then initiated by charging 4.3 mL of 0.05 M $SnCl_4$ in hexane into the reactor. After 11.0 minutes from its commencement, the polymerization was terminated by the addition of 4.56 mL of isopropanol in 1360 g of hexane. The resulting polymer cement was removed from the reactor, coagulated with 3 gallons of isopropanol containing 5 g of 2,6-di-t-butyl-4-methylphenol, and then dried on a drum dryer. The yield of the polymer was 156.7 g. The properties of the resulting polymer are summarized in Table II.

TABLE II

| Example No. | 7 | 8 |
|---|---|---|
| Nd compound | NdP | NdV |
| Halogen compound | $SnCl_4$ | $SnCl_4$ |
| Polymerization system | bulk | bulk |
| $ML_{1+4}$ | 41.6 | 44.3 |
| $M_n$ | 159,000 | 132,000 |
| $M_w$ | 376,000 | 438,000 |
| $M_w/M_n$ | 2.4 | 3.3 |
| % cis-1,4 | 98.9 | 98.9 |
| % trans-1,4 | 0.9 | 0.7 |
| % 1,2 | 0.2 | 0.4 |

Example 8

Comparative Example to Example 7

In this experiment, cis-1,4-polybutadiene was prepared by polymerizing 1,3-butadiene monomer in bulk with a catalyst system comprising NdV, TIBA, and $SnCl_4$.

A procedure similar to that used in Example 1 was employed. After the monomer was thermostated at 32° C., 29.1 mL of 0.68 M TIBA in hexane was charged into the reactor, followed by the addition of 4.6 mL of 0.054 M NdV. The polymerization was then initiated by charging 4.3 mL of 0.05 M $SnCl_4$ in hexane into the reactor. After 19.0 minutes from its commencement, the polymerization was terminated by the addition of 4.56 mL of isopropanol in 1360 g of hexane. The resulting polymer cement was removed from the reactor, coagulated with 3 gallons of isopropanol containing 5 g of 2,6-di-t-butyl-4-methylphenol, and then dried on a drum dryer. The yield of the polymer was 112.5 g. The properties of the resulting polymer are summarized in Table II.

A comparison of the results obtained in Example 8 with those obtained in Example 7 indicates that the use of NdP instead of NdV in the bulk polymerization of 1,3-butadiene gives rise to cis-1,4-polybutadiene having a narrower molecular weight distribution.

Example 9

In this experiment, cis-1,4-polybutadiene was prepared by polymerizing 1,3-butadiene monomer in bulk with a catalyst system comprising TTC-modified NdP, TIBA, and diethylaluminum chloride (DEAC).

A procedure similar to that used in Example 1 was employed. After the monomer was thermostated at 32° C., 20.0 mL of 0.68 M TIBA in hexane was charged into the reactor, followed by the addition of 2.0 mL of 0.125 M TTC-modified NdP in methylcyclohexane. The polymerization was then initiated by charging 8.7 mL of 0.1 M DEAC in hexane into the reactor. After 8.0 minutes from its commencement, the polymerization was terminated by the addition of 4.56 mL of isopropanol in 1360 g of hexane. The resulting polymer cement was removed from the reactor, coagulated with 3 gallons of isopropanol containing 5 g of 2,6-di-t-butyl-4-methylphenol, and then dried on a drum dryer. The yield of the polymer was 167.1 g. The properties of the resulting polymer are summarized in Table III.

TABLE III

| | Example No. | | | | |
|---|---|---|---|---|---|
| | 9 | 10 | 11 | 12 | 13 |
| Nd compound | NdP | NdP | NdP | NdP | NdP |
| Halogen compound | DEAC | DEAI | $SnCl_4$ | $SnBr_4$ | $SnI_4$ |
| Polymerization system | bulk | bulk | bulk | bulk | bulk |
| $ML_{1+4}$ | 18.7 | 22.0 | 20.7 | 23.8 | 17.6 |
| $M_n$ | 124,000 | 21,000 | 125,000 | 56,000 | 91,000 |
| $M_w$ | 272,000 | 594,000 | 281,000 | 400,000 | 418,000 |
| $M_w/M_n$ | 2.2 | 28.5 | 2.4 | 7.2 | 4.6 |
| % cis-1,4 | 98.7 | 97.5 | 98.8 | 98.6 | 97.4 |
| % trans-1,4 | 1.1 | 1.8 | 1.0 | 1.1 | 2.2 |
| % 1,2 | 0.2 | 0.7 | 0.2 | 0.3 | 0.4 |

Example 10

Comparative Example to Example 9

In this experiment, cis-1,4-polybutadiene was prepared by polymerizing 1,3-butadiene monomer in bulk with a catalyst system comprising neodymium TTC-modified NdP, TIBA, and diethylaluminum iodide (DEAI).

A procedure similar to that used in Example 1 was employed. After the monomer was thermostated at 32° C., 20.0 mL of 0.68 M TIBA in hexane was charged into the reactor, followed by the addition of 2.0 mL of 0.125 M TTC-modified NdP in methylcyclohexane. The polymerization was then initiated by charging 8.7 mL of 0.1 M DEAI in hexane into the reactor. After 8.0 minutes from its commencement, the polymerization was terminated by the addition of 4.56 mL of isopropanol in 1360 g of hexane. The resulting polymer cement was removed from the reactor, coagulated with 3 gallons of isopropanol containing 5 g of 2,6-di-t-butyl-4-methylphenol, and then dried on a drum dryer. The yield of the polymer was 16.3 g. The properties of the resulting polymer are summarized in Table III.

A comparison of the results obtained in Example 10 with those obtained in Example 9 indicates that the use of DEAC instead of DEAI in the bulk polymerization of 1,3-butadiene gives rise to cis-1,4-polybutadiene having a much narrower molecular weight distribution as well as a higher cis-1,4-linkage content.

Example 11

In this experiment, cis-1,4-polybutadiene was prepared by polymerizing 1,3-butadiene monomer in bulk with a catalyst system comprising neodymium TTC-modified NdP, TIBA, and $SnCl_4$.

A procedure similar to that used in Example 1 was employed. After the monomer was thermostated at 32° C., 29.1 mL of 0.68 M TIBA in hexane was charged into the reactor, followed by the addition of 2.0 mL of 0.125 M TTC-modified NdP in methylcyclohexane. The polymerization was then initiated by charging 4.3 mL of 0.05 M $SnCl_4$ in hexane into the reactor. After 8.6 minutes from its commencement, the polymerization was terminated by the addition of 4.56 mL of isopropanol in 1360 g of hexane. The resulting polymer cement was removed from the reactor, coagulated with 3 gallons of isopropanol containing 5 g of 2,6-di-t-butyl-4-methylphenol, and then dried on a drum dryer. The yield of the polymer was 182.6 g. The properties of the resulting polymer are summarized in Table III.

Example 12

Comparative Example to Example 11

In this experiment, cis-1,4-polybutadiene was prepared by polymerizing 1,3-butadiene monomer in bulk with a catalyst system comprising TTC-modified NdP, TIBA, and tin tetrabromide (SnBr$_4$).

A procedure similar to that used in Example 1 was employed. After the monomer was thermostated at 32° C., 29.1 mL of 0.68 M TIBA in hexane was charged into the reactor, followed by the addition of 2.0 mL of 0.125 M TTC-modified NdP in methylcyclohexane. The polymerization was then initiated by charging 8.6 mL of 0.025 M SnBr$_4$ in hexane into the reactor. After 9.0 minutes from its commencement, the polymerization was terminated by the addition of 4.56 mL of isopropanol in 1360 g of hexane. The resulting polymer cement was removed from the reactor, coagulated with 3 gallons of isopropanol containing 5 g of 2,6-di-t-butyl-4-methylphenol, and then dried on a drum dryer. The yield of the polymer was 78.7 g. The properties of the resulting polymer are summarized in Table III.

After the polymer cement was discharged from the reactor, visual inspection of the reactor revealed that reactor fouling had occurred during the polymerization, with the wall of the reactor as well as the agitator coated with insoluble gelled polymer.

A comparison of the results obtained in Example 12 with those obtained in Example 11 indicates that the use of SnCl$_4$ instead of SnBr$_4$ gives rise to cis-1,4-polybutadiene having a much narrower molecular weight distribution as well as a higher cis-1,4-linkage content. In addition, unlike the use of SnBr$_4$, the use of SnCl$_4$ does not lead to reactor fouling. This is advantageous since the reactor can be used for an increased period of time before it needs to be cleaned.

Example 13

Comparative Example to Example 11

In this experiment, cis-1,4-polybutadiene was prepared by polymerizing 1,3-butadiene monomer in bulk with a catalyst system comprising TTC-modified NdP, TIBA, and tin tetraiodide (SnI$_4$).

A procedure similar to that used in Example 1 was employed. After the monomer was thermostated at 32° C., 29.1 mL of 0.68 M TIBA in hexane was charged into the reactor, followed by the addition of 2.0 mL of 0.125 M TTC-modified NdP in methylcyclohexane. The polymerization was then initiated by charging 8.6 mL of 0.025 M SnI$_4$ in hexane into the reactor. After 9.7 minutes from its commencement, the polymerization was terminated by the addition of 4.56 mL of isopropanol in 1360 g of hexane. The resulting polymer cement was removed from the reactor, coagulated with 3 gallons of isopropanol containing 5 g of 2,6-di-t-butyl-4-methylphenol, and then dried on a drum dryer. The yield of the polymer was 114.9 g. The properties of the resulting polymer are summarized in Table III.

A comparison of the results obtained in Example 13 with those obtained in Example 11 indicates that the use of SnCl$_4$ instead of SnI$_4$ gives rise to cis-1,4-polybutadiene having a much narrower molecular weight distribution as well as a higher cis-1,4-linkage content.

What is claimed is:

1. A process for preparing a polydiene, the process comprising the step of:
polymerizing 1,3-butadiene with a lanthanide-based catalyst system including the combination or reaction product of: (a) a lanthanide organophosphate, (b) an alkylating agent consisting essentially of a trihydrocarbyl aluminum compound, and (c) a chlorine-containing compound, where said step of polymerizing takes place within a polymerization mixture that includes less than 20% by weight of solvent based on the total weight of the polymerization mixture, where the polydiene has a cis-1,4-linkage content in excess of 98% and a molecular weight distribution of less than about 2.2.

2. The process of claim 1, where said step of polymerizing takes place within a polymerization mixture that is substantially devoid of solvent.

3. The process of claim 1, where the lanthanide-based catalyst system is formed in situ by adding the lanthanide organophosphate, the alkylating agent, and the chlorine-containing compound directly and individually to the 1,3-butadiene.

4. The process of claim 1, where the lanthanide organophosphate is defined by the formula:

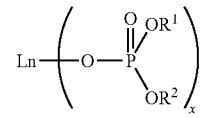

where Ln is a lanthanide atom, x is the oxidation state of the lanthanide atom, and $R^1$ and $R^2$ are each independently a mono-valent organic group, or $R^1$ and $R^2$ join to form a divalent organic group.

5. The process of claim 1, where the lanthanide organophosphate is selected from the group consisting of neodymium di-n-butyl phosphate, neodymium dipentyl phosphate, neodymium dihexyl phosphate, neodymium diheptyl phosphate, neodymium dioctyl phosphate, neodymium bis(1-methylheptyl)phosphate, neodymium bis(2-ethylhexyl)phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl)phosphate, neodymium butyl(2-ethylhexyl)phosphate, neodymium(1-methylheptyl)(2-ethylhexyl)phosphate, and neodymium(2-ethylhexyl)(p-nonylphenyl)phosphate.

6. The process of claim 1, where the chlorine-containing compound is selected from the group consisting of elemental chlorine, hydrogen chlorides, organic chlorides, inorganic chlorides, metallic chlorides, and mixtures thereof.

7. The process of claim 1, where the polydiene has a cis-1,4-linkage content in excess of 98.5% and a molecular weight distribution of less than 2.2.

8. The process of claim 1, where the polydiene has a cis-1,4-linkage content in excess of 99% and a molecular weight distribution of less than 2.0.

9. The process of claim 1, where the trihydrocarbyl aluminum compound is selected from the group consisting of trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

10. The process of claim 1, where the lanthanide organophosphate is a neodymium organophosphate.

11. The process of claim 10, where the lanthanide organophosphate is neodymium bis(2-ethylhexyl)phosphate.

12. The process of claim 11, where the chlorine-containing compound is diethylaluminum chloride.

13. The process of claim 12, where the alkylating agent is triisobutylaluminum.

14. The process of claim 10, where the chlorine-containing compound is an organometallic chloride.

15. The process of claim 14, where the organometallic chloride is an organoaluminum chloride.

16. The process of claim 15, where the alkylating agent is selected from the group consisting of trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

17. A process for preparing a polydiene, the process comprising the step of:
    introducing (a) 1,3-butadiene monomer, (b) a lanthanide organophosphate, (c) an alkylating agent consisting essentially of a trihydrocarbyl aluminum compound, and (d) a chlorine-containing compound, where said step of introducing forms a polymerization mixture that includes less than 20% by weight of solvent based on the total weight of the polymerization mixture, where the polydiene has a cis-1,4-linkage content in excess of 98% and a molecular weight distribution of less than 2.2.

18. The process of claim 17, where the polymerization mixture is substantially devoid of solvent.

19. The process of claim 17, where the lanthanide organophosphate is defined by the formula:

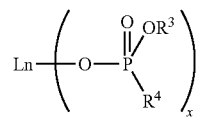

where Ln is a lanthanide atome, x is the oxidation state of the lanthanide atom, and $R^1$ and $R^2$ are each independently a mono-valent organic group, or $R^1$ and $R^2$ join to form a divalent organic group.

20. The process of claim 1, where the lanthanide compound is combined with a Lewis acid prior to said step of introducing or, where the lanthanide organophosphate is thoroughly pre-mixed with the monomer prior to combining the lanthanide organophosphate with the alkylating agent and the chlorine-containing compound.

21. A process for preparing a polydiene, the process comprising the steps of:

(i) providing 1,3-butadiene monomer to be polymerized;
(ii) introducing a lanthanide compound to the 1,3-butadiene monomer to be polymerized, where the lanthanide compound is lanthanide organophosphate, where said step of introducing a lanthanide compound may optionally include introducing an alkylating agent consisting essentially of a trihydrocarbyl aluminum compound, a Lewis acid, additional monomer to be polymerized, or a combination of two or more of the alkylating agent, the Lewis acid, and the additional monomer, where the amount of the lanthanide compound is less than 10 mmol per 100 gram of the total monomer to be polymerized, and where the molar ratio of the Lewis acid, if introduced, to the lanthanide compound is less than 0.25:1;
(iii) introducing, independent of said step (ii), a chlorine-containing compound and optionally an alkylating agent to the 1,3-butadiene monomer to be polymerized, where the molar ratio of the chlorine-containing compound introduced in step (iii) to the lanthanide compound introduced in step (ii) is at least 0.5:1; and
(iv) optionally introducing, independent of said steps (ii) and (iii), an alkylating agent to the 1,3-butadiene monomer to be polymerized, with the proviso that an alkylating agent is introduced to the monomer to be polymerized in at least one of said steps (ii), (iii), and (iv); whereby said steps (i), (ii), (iii), and (iv) form a polymerization mixture that includes less than 20% by weight of solvent based on the total weight of the polymerization mixture, and where the polydiene has a cis-1,4-linkage content in excess of 98% and a molecular weight distribution of less than 2.2.

22. A process for preparing a polydiene, the process comprising the step of:
    polymerizing 1,3-butadiene with a lanthanide-based catalyst system including the combination or reaction product of: (a) a lanthanide organophosphate, (b) an alkylating agent consisting essentially of a trihydrocarbyl aluminum compound, and (c) a chlorine-containing compound selected from the group consisting of organometallic chlorides and metallic chlorides, where said step of polymerizing takes place within a polymerization mixture that includes less than 20% by weight of solvent based on the total weight of the polymerization mixture, where the polydiene has a cis-1,4-linkage content in excess of 98% and a molecular weight distribution of less than about 2.2, where the lanthanide organophosphate is combined with a Lewis acid prior to introducing the lanthanide organophosphate with the chlorine-containing compound or, where the lanthanide organophosphate is thoroughly pre-mixed with the monomer prior to combining the lanthanide organophosphate with the alkylating agent and the chlorine-containing compound.

23. The process of claim 22, where the lanthanide organophosphate is a neodymium organophosphate.

24. The process of claim 23, where the lanthanide organophosphate is neodymium bis(2-ethylhexyl)phosphate.

25. The process of claim 24, where the chlorine-containing is diethylaluminum chloride.

26. The process of claim 25, where the alkylating agent is triisobutylaluminum.

27. The process of claim 23, where the chlorine-containing compound is an organometallic chloride.

28. The process of claim 27, where the organometallic chloride is an organoaluminum chloride.

29. The process of claim 28, where the, where the alkylating agent is selected from the group consisting of trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

* * * * *